Patented Apr. 29, 1947

2,419,553

UNITED STATES PATENT OFFICE 2,419,553

NUCLEAR SUBSTITUTED 2-HYDROXY-BENZOPHENONES AND METHOD OF MAKING SAME

Thomas Houtman, Jr., Midland, Mich., assignor to The Dow Chemical Company, Midland, Mich., a corporation of Michigan No Drawing. Application March 2, 1945, Serial No. 580,714

16 Claims. (Cl. 260—591)

This invention concerns an improved method of reacting aroyl halides with certain nuclear substituted phenols to produce corresponding 2-hydroxy diaromatic ketones. It also concerns certain new polychloro-monohydroxy-benzophenones prepared by the method.

The classical Friedel-Crafts reaction between acyl halides and aromatic compounds in the presence of aluminum chloride to produce ketones is, of course, well known. However, it is also known that the reaction is of limited applicability and that special conditions, e. g., the employment of particular reaction media, are in some instances required in order to obtain satisfactory yields of the ketone products. For instance, E. H. Cox, in J. A. C. S. 49, 1028 (1927), teaches that the reaction of benzoyl chloride with phenols in the presence of anhydrous aluminum chloride often fails altogether or results in low yields of the benzoyl phenols, unless the hydroxy group has previously been protected or the reaction is carried is carried out in the presence of nitrobenzene. Such operations of protecting the hydroxyl radical, e. g., by replacing its hydrogen with a group which is subsequently to be removed, or by employing nitrobenzene as a medium from which the ketone product must subsequently be separated, are inconvenient and costly. Cox avoids these difficulties by first preparing, or obtaining, in purified form a phenolic ester of benzoic acid, which ester is an isomer of the desired ketone product, and heating the ester together with aluminum chloride to effect a molecular rearrangement in accordance with the Fries reaction and cause formation of the desired hydroxy-diaryl ketone. Because of the number and nature of the consecutive steps involved, the method of Cox is not well suited to commercial practice.

I have found that aroyl halides may be reacted directly with certain nuclear substituted phenols in the presence of aluminum chloride without the aid of a reaction medium other than the reaction materials, provided the reaction is carried out under the conditions hereinafter described, and that corresponding nuclear substituted 2-hydroxy-benzophenones may readily be produced in good yields and in easily purifiable form by operating as provided by the invention. Peculiarly, the reaction is one capable of generating two molecular equivalents of hydrogen halide per mole of the phenol entering into the reaction. In this respect it differs from conventional Friedel-Crafts reactions. Apparently, a portion of the halogen content of the hydrogen halide is supplied by the aluminum chloride and a portion is supplied by the aroyl halide. I have also prepared by the present method a number of new polychlorinated 2-hydroxy-benzophenones having the general formula:

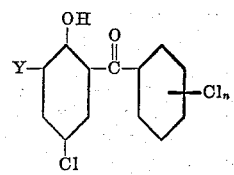

wherein Y represents a member of the group consisting of hydrogen and chlorine atoms and $n$ is one of the integers 1 and 2. The new compounds, which contain chlorine substituents on both of the aromatic nuclei, are useful as ingredients of fungicides, insecticides and as modifying agents for incorporation together with synthetic resins.

The invention is restricted in scope to the reaction of aroyl halides with phenols having the general formula:

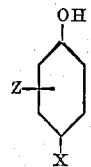

wherein X represents a member of the group consisting of halogens, e. g., bromine, chlorine, and fluorine, and alkyl radicals containing not more than two carbon atoms and Z represents a member of the group consisting of hydrogen, halogens and alkyl radicals containing not more than two carbon atoms. Examples of phenols having said general formula, and which may be employed in the process, are 4-bromophenol, 2.4-dichlorophenol, 4-bromo-2-chlorophenol, 4-methyl-phenol, 2.4-dimethyl-phenol, 4-ethyl-phenol, 2.4-diethyl-phenol, 2-chloro-4-methyl-phenol, 4-chloro-2-methyl-phenol, 2-chloro-4-ethyl-phenol, 4-chloro-2-ethyl-phenol, 2-bromo-4-methyl-phenol and 2-fluoro-4-methyl-phenol, etc. Although there may be instances in which phenols other than those having the above general formula may be reacted with an aroyl halide by the procedure of this invention to produce corresponding hydroxy-diaromatic ketones in good yields, there have been a number of instances in which such other phenols have failed to react satisfactorily. It is for this reason that the invention is restricted to the employment of phenols having the foregoing general formula.

Examples of aroyl halides which may be used as reactants in the process are benzoyl chloride, benzoyl bromide, 2-chloro-benzoyl chloride, 2-bromo-benzoyl bromide, 4-chloro-benzoyl chloride, 3.4-dichloro-benzoyl chloride, 2.3-dibromo-benzoyl bromide, 2.4-dichloro-benzoyl chloride, 2.3-dimethyl-benzoyl chloride, 2.4-dimethyl-benzoyl chloride, 2-ethyl-benzoyl chloride, 4-ethyl-benzoyl chloride, naphthoyl bromide and naphthoyl chloride, etc. Apparently any aroyl halide which is free of nuclear substituents, e. g., acidic or basic radicals, capable of reacting with the aluminum chloride may be employed in the process.

The aroyl halide and phenolic reactants are preferably employed in equimolecular proportions, but as much as a 20 per cent excess of either reactant may be used, if desired. The aluminum chloride is preferably used in amount corresponding approximately to the molecular equivalent of the aroyl halide, but it may be employed in somewhat smaller or greater amount, e. g., in amount corresponding to between 0.8 and 1.2 of the molecular equivalent of the aroyl halide.

The aroyl halide, phenolic reactant and aluminum chloride are admixed in the proportions just stated, while stirring and heating the mixture at a temperature sufficient to render the same molten without causing an excessive loss, e. g., a more than 15 per cent loss, of either reactant by vaporization. In most instances, the ingredients are admixed while heating the resultant mixture at temperatures between 90° and 140° C., and preferably between 100° and 130° C., but lower or higher temperatures may sometimes be used. In all instances, it is important that the reaction ingredients be melted prior to or during formation of the mixture, since otherwise the rapid and thorough mixing necessary to obtain a satisfactory yield of the product cannot readily be accomplished.

The order in which the reaction materials are admixed is of minor consequence and may be varied. Usually the powdered aluminum chloride is heated and the aroyl halide and the phenolic reactant, or a mixture of the two, are added rapidly with stirring. Alternatively, a mixture of the phenolic reactant and the aluminum chloride may be heated and the aroyl halide be added with stirring.

During and subsequent to admixture of the starting materials, a vigorous reaction occurs and hydrogen halide is evolved. As the reaction progresses the temperature may be raised without excessive loss of material by vaporization. It is important that the mixture be heated to a temperature between 160° and 190° C., preferably between 175° and 190° C., in the later stages of the reaction. It is also desirable, although not essential, that the reaction mixture be heated to the ultimate temperature of from 160° to 190° C. within one hour, and preferably within 30 minutes, after the mixture is formed. When the reaction is completed at temperatures appreciably lower than 160° C., the ketone product is obtained in a relatively low yield and in admixture with a considerable amount of a phenol ester, or other by-products, from which it must subsequently be separated. If the reaction is completed at temperatures appreciably higher than 190° C., decomposition and discoloration of the ketone product often occur to an objectionable extent. Prolonged heating, e. g., for an hour or more, of the molten reaction mixture at temperatures below 160° C. usually also results in discoloration of the ketone product. By carrying out the reaction under the conditions required by the invention, such difficulties may be avoided.

The reaction is usually complete within one hour, and often within 30 minutes, after the mixture has been brought to the temperatures of from 160° to 190° C., but longer heating may in some instances be required. The progress of the reaction may be followed by observing the amount of hydrogen halide evolved. It sometimes is desirable to discontinue the reaction slightly short of completion, since continued heating after completion of the reaction may result in discoloration of the product. Usually, heating is continued until at least 75, preferably more than 85, per cent of the hydrogen halide capable of being formed has been evolved. When the reaction has been completed to the desired extent, heating is discontinued and the aluminum compound present is deactivated or removed, preferably by pouring the hot product into several parts of a dilute aqueous hydrochloric acid solution with stirring. The product is separated, e. g., by filtration, and is further purified, if necessary, by recrystallization from solvents such as methyl or ethyl alcohol, or in other usual ways. The yield of the ketone product is usually in the order of 80 per cent of theoretical or higher.

The following examples describe a number of ways in which the principle of the invention has been applied, but are not to be construed as limiting the invention:

*Example 1*

135 grams (1 mole) of aluminum chloride was heated to approximately 95° C. and 141 grams (1 mole) of benzoyl chloride and 130 grams (1 mole) of 4-chloro-phenol were added simultaneously over a period of approximately 2 minutes while vigorously stirring the mixture and heating it at approximately the temperature just stated. Stirring was continued and the mixture was heated in about 8 minutes to a temperature between 180° and 190° C. The mixture was maintained at temperatures within this range with continued stirring for a period of 35 minutes. It was then poured with stirring into 1.5 liters of an aqueous hydrochloric acid solution of 5 per cent concentration. The product was separated by filtration of the aqueous mixture and was purified by dissolving the same in methanol, decolorizing the solution with activated charcoal, filtering, and crystallizing the product from the filtrate. Substantially pure 5-chloro-2-hydroxy-benzophenone was obtained in a yield of approximately 87 per cent of theoretical.

*Example 2*

140 grams of aluminum chloride was heated to a temperature of 100° C. and 108 grams of para-cresol was added with stirring in a period of 2 minutes. While continuing stirring and heating of the mixture at approximately 100° C., 175 grams of 2-chloro-benzoyl chloride was added over another 2-minute period. The temperature was then raised to 175° C. in a period of 6 minutes, at the end of which time the mixture had thickened to an extremely viscous and almost paste-like mass. The mixture, while hot, was added with stirring to approximately 1.5 liters of a dilute aqueous hydrochloric acid solution. The solid ketone product was separated by filtration from the aqueous mixture and was re-dissolved in 1.65 liters of an aqueous potassium hydroxide solution of approximately 9 per cent by weight concentration. The alkaline solution was filtered and the filtrate was acidified with hydrochloric acid to re-precipitate the ketone. The latter was separated by filtration and recrystallized from approximately 1.5 liters of methyl alcohol. There was obtained 150 grams of 2-hydroxy-5-methyl-2'-chlorobenzophenone having a melting point of 77–78° C.

*Example 3*

101 grams of aluminum chloride was heated to about 100° C. and 100 grams of 4-chlorophenol and 150 grams of 3.4-dichlorobenzoyl chloride were added simultaneously and with stirring over a period of 3 minutes. Stirring was continued and the mixture was heated to 180° C. in a period of 7 minutes. The mixture was maintained at temperatures between 178° and 180° C. with continued stirring for a further period of 16 minutes, at which time the reaction mixture was poured into a dilute aqueous solution of hydrochloric acid and the ketone product was separated by filtration. The product was re-dissolved in 1.65 liters of an aqueous potassium hydroxide solution of 9 per cent concentration. The alkaline solution was filtered and the filtrate was acidified with hydrochloric acid to re-precipitate the ketone. The latter was purified by recrystallization from methyl alcohol. There was obtained 123 grams of 5.3'.4'-trichloro-2-hydroxy benzophenone in the form of yellow crystals having a melting point of 92–92.5° C. An alkali-insoluble residue from the treatment with the potassium hydroxide solution was dissolved in methyl alcohol and crystallized from the solution. There was obtained 25 grams of an unidentified by-product in the form of white, needle-like crystals melting at 107–108° C.

*Example 4*

The procedure of Example 3 was repeated except that 163 grams of 2.4-dichloro-phenol and 140.5 grams of benzoyl chloride were employed as the phenolic and aroyl halide reactants. There was obtained 123 grams of crystalline 3.5-dichloro-2-hydroxy-benzophenone melting at 113–114° C. As an alkali-insoluble by-product there was obtained 24 grams of 2.4-dichloro-phenyl-benzoate having a melting point of 95° C.

*Example 5*

The procedure of Example 3 was repeated, except that 4-chlorophenol and 2-chloro-benzoyl chloride were employed as the reactants. There was obtained 5.2'-dichloro-2-hydroxy-benzophenone, a yellow crystalline compound melting at 106.5–107.5° C.

*Example 6*

The procedure of Example 3 was again repeated, except that 2.4-dichloro-phenol and 2-chloro-benzoyl chloride were employed as the reactants. There was obtained 3.5.2'-trichloro-2-hydroxy-benzophenone, a yellow crystalline compound, melting at 92° C.

Other modes of applying the principle of the invention may be employed instead of those explained, change being made as regards the method or products herein disclosed, provided the steps or compounds stated by any of the following claims or the equivalent of such stated steps or compounds be employed.

I therefore particularly point out and distinctly claim as my invention:

1. The method which comprises admixing approximately equimolecular amounts of aluminum chloride, an aroyl halide and a phenol having the general formula:

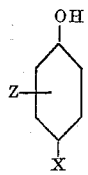

wherein X represents a member of the group consisting of halogen atoms and alkyl groups containing not more than 2 carbon atoms and Z represents a member of the group consisting of hydrogen, halogens, and alkyl radicals containing not more than 2 carbon atoms, while stirring and heating the mixture at temperatures between 90° and 140° C., and thereafter raising the temperature of the mixture to between 160° and 190° C.

2. The method, as described in claim 1, wherein the reaction mixture is heated to a temperature between 160° and 190° C. within one hour after being formed and a 2-hydroxy-diaromatic ketone product is separated from the reacted mixture.

3. The method, as described in claim 1, wherein the reaction mixture is heated to a temperature between 170° and 190° C. within 30 minutes after being formed and is maintained at temperatures within the range just stated until between 1.5 and 2 molecular equivalents of hydrogen halide has been evolved per mole of the phenol employed as a starting material, the reacted mixture is then cooled and a 2-hydroxy-diaromatic ketone, formed by the reaction, is separated from the reacted mixture.

4. The method which comprises admixing approximately equimolecular amounts of aluminum chloride, 4-chlorophenol and 2-chloro-benzoyl chloride while stirring and heating the mixture at a temperature between 90° C. and 140° C., thereafter raising the temperature of the mixture to between 160° and 190° C., and separating 5,2'-dichloro-2-hydroxy-benzo-phenol from the reacted mixture.

5. The method, as described in claim 4, wherein the reaction mixture is heated to a temperature between 160° and 190° C. within one hour after being formed.

6. The method, as described in claim 4, wherein the reaction mixture is heated to a temperature between 170° and 190° C. within 30 minutes after being formed and is maintained at temperatures within the range just stated until between 1.5 and 2 molecular equivalents of hydrogen halide has been evolved per mole of the 4-chlorophenol employed as a starting material, the reacted mixture is then cooled and 5,2'-dichloro-2-hydroxy-benzophenone is separated from the reacted mixture.

7. The method which comprises admixing approximately equimolecular amounts of aluminum chloride, 2.4-dichlorophenol and 2-chloro-benzoyl chloride while stirring and heating the mixture at a temperature between 90° and 140° C., thereafter raising the temperature of the mixture to between 160° and 190° C., and separating 3.5.2'-trichloro-2-hydroxy - benzophenone from the reacted mixture.

8. The method, as described in claim 7, wherein the reaction mixture is heated to a temperature between 160° and 190° C. within one hour after being formed.

9. The method, as described in claim 7, wherein the reaction mixture is heated to a temperature between 170° and 190° C. within 30 minutes after being formed and is maintained at temperatures within the range just stated until between 1.5 and 2 molecular equivalents of hydrogen halide has been evolved per mole of the 2.4-dichloro-phenol employed as a starting material, the reacted mixture is then cooled and 3.5.2'-trichloro-2-hydroxy-benzophenone is separated.

10. The method which comprises admixing approximately equimolecular amounts of aluminum chloride, 4-chloro-phenol and 3.4-dichloro-benzoyl chloride while stirring and heating the mixture as it is formed at a temperature between 90° and 140° C., thereafter raising the temperature of the mixture to between 160° and 190° C., and separating 5.3'.4'-trichloro-2-hydroxy - benzophenone from the reacted mixture.

11. The method, as described in claim 10, wherein the reaciton mixture is heated to a temperature between 160° and 190° C. within one hour after being formed.

12. The method, as described in claim 10, wherein the reaction mixture is heated to a temperature between 170° and 190° C. within 30 minutes after being formed and is maintained at temperatures within the range just stated until between 1.5 and 2 molecular equivalents of hydrogen halide has been evolved per mole of the 4-chloro-phenol employed as a starting material, the mixture is then cooled and 5.3'.4'-trichloro-2-hydroxy-benzophenone is separated.

13. A polychloro-2 - hydroxy - benzophenone having the general formula:

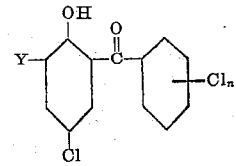

wherein Y represents a member of the group consisting of halogen atoms and alkyl radicals containing not more than 2 carbon atoms and $n$ is an integer of from 1 to 2.

14. 5.2'-dichloro-2-hydroxy-benzophenone.
15. 5.3'.4'-trichloro-2-hydroxy-benzophenone.
16. 3.5.2'-trichloro-2-hydroxy-benzophenone.

THOMAS HOUTMAN, Jr.

REFERENCES CITED

The following references are of record in the file of this patent:
Chemical Abstracts, vol. 22, p. 1579 (1928).
Chemical Abstracts, vol. 24, p. 1106 (1930).
Beilstein, 4th ed., vol. VIII, p. 156.

Certificate of Correction

Patent No. 2,419,553.   April 29, 1947.

THOMAS HOUTMAN, JR.

It is hereby certified that error appears in the printed specification of the above numbered patent requiring correction as follows: Column 6, line 44, claim 4, for "phenol" read *phenone*; and that the said Letters Patent should be read with this correction therein that the same may conform to the record of the case in the Patent Office.

Signed and sealed this 15th day of July, A. D. 1947.

[SEAL]

LESLIE FRAZER,
*First Assistant Commissioner of Patents.*